July 28, 1964
W. P. RAARUP ETAL
3,142,545
SYSTEM FOR HYDROTREATING OF HYDROCARBONS
Filed March 24, 1961
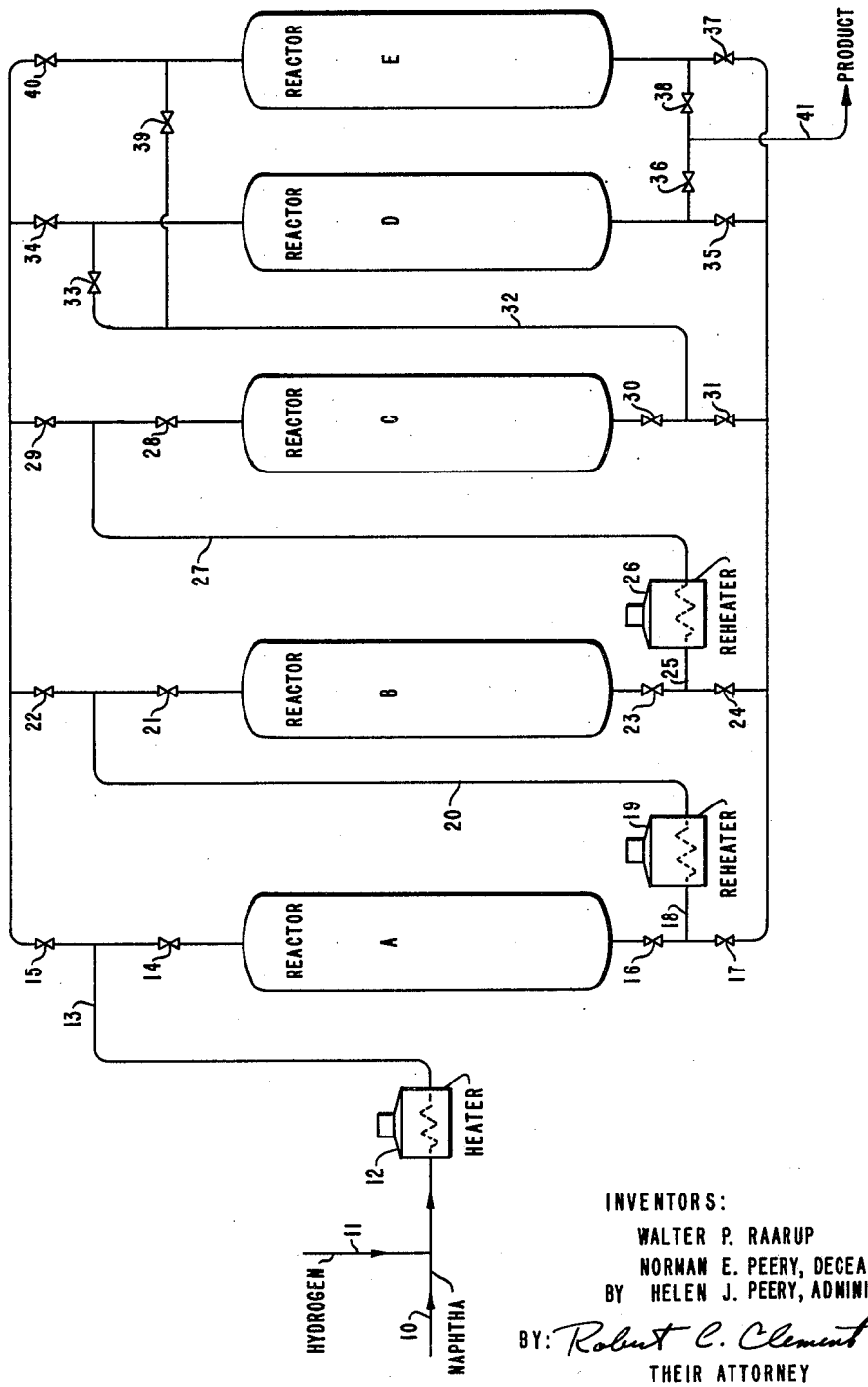
INVENTORS:
WALTER P. RAARUP
NORMAN E. PEERY, DECEASED
BY HELEN J. PEERY, ADMINISTRATRIX
BY: Robert C. Clement
THEIR ATTORNEY United States Patent Office 3,142,545
Patented July 28, 1964

3,142,545
SYSTEM FOR HYDROTREATING OF
HYDROCARBONS
Walter P. Raarup, Darien, Conn., and Norman E. Peery, deceased, late of San Francisco, Calif., by Helen J. Peery, administratrix, San Francisco, Calif., assignors to Shell Oil Company, New York, N.Y., a corporation of Delaware
Filed Mar. 24, 1961, Ser. No. 98,732
1 Claim. (Cl. 23—288)

This invention relates to multi-stage hydrotreating of hydrocarbon oils with noble metal catalysts.

This application is a continuation-in-part of application Serial No. 801,241, filed March 24, 1959, now abandoned.

An object of the invention is to provide a system which at a minimum of capital cost provides the utmost versatility and improved processing. Other advantages, the attainment of which are objects of the invention, will appear from the description of the invention.

In recent years noble metal catalysts have come into wide use for the hydrotreating of various oils. The term "hydrotreating" is meant to include hydrogenation, hydrosulfurization, hydroforming and destructive hydrogenation, i.e. hydrocracking. The term "noble metal" is meant to include the various noble metals of Group VIII of the Periodic Table and particularly rhodium, palladium and platinum. These metals are extremely costly and their supply is quite limited. They are used in the catalysts for such hydrotreating operations in extremely small concentrations generally under 1% by weight. Partly due to their nature and partly due to the small concentrations of these metals used in the catalysts the catalysts are extremely sensitive to various poisons. While it is true that in some cases these noble metal catalysts have been used over long periods of time without serious loss of activity, this is only true where exceptional care has been exercised in purifying the feed to be treated.

Also the catalysts, and especially those containing platinum as the active promoter, are generally made by impregnating an alumina carrier with a solution containing or derived from chloroplatinic acid as this is the only soluble platinum compound readily available in commercial quantities. The resulting catalyst contains chlorine generally in an amount approximately equal to, if not greater than, the platinum. Often small amounts of additional chlorine and fluorine are also added. The chlorine is attached to the catalyst in an unknown form but only in a moderately strong fashion. During use and regeneration of the catalyst the chlorine in particular tends to migrate towards the exit of the system with the product and is eventually lost.

It is known that the halogen in such catalysts exerts a profound influence. If it is lost from the catalyst the catalytic properties are greatly impaired or changed and if it is too high by only a matter of a few tenths of 1% by weight the catalyst becomes wild. Consequently, any migration of the chlorine from a portion of the catalyst in the fore section to a portion of the catalyst down stream is extremely detrimental on two accounts. This migration of chlorine from the first contacted portion of the catalyst is particularly liable to occur if there are even very small amounts of water in the feed and in this connection it should be noted that small amounts of water are often deliberately included to prevent or curtail hydrocracking reactions.

In regenerating catalysts of the type in question in this service it is found that treatment of the catalyst with a halogen or a volatile halogen compound is occassionally required to render the catalyst not only regenerable to its original state activity level but also to render it capable of sustaining its activity during use. This treatment also makes possible the migration of the platinum or other noble metal promoter and this migration when it occurs is likewise most detrimental. Thus, any chlorine compound introduced or formed in the reaction zone which can react with the alumina in the catalyst support during such treatment can produce aluminum chloride which is a readily volatile compound at even comparatively low temperatures. Vapors of aluminum chloride passing through the catalyst readily combine with platinum to produce a volatile complex of some sort. This is in fact the basis of a method for recovering the platinum values from spent platinum containing catalyst (see U.S. Patent No. 2,828,200 to Nixon).

A further significant consideration is the effect of sulfur compounds. As previously mentioned, catalysts of the type in question have in some cases been used over considerable periods without regeneration. In these cases the oils treated have been carefully desulfurized prior to treatment. It will be understood that there is no desulfurization method commercially used that is capable of removing all of the sulfur and that even carefully desulfurized oils normally contain at least around 0.001% sulfur. Sulfur in the feed, even in these small amounts, reacts with the reactor walls, screens, piping, heating coils, etc. until an equilibrium sulfiding of such parts is established. This does no harm in general operation with well desulfurized oils since, although the activity of the catalyst is lowered, a small amount of sulfur can be tolerated by the catalyst. This sulfiding even to a minor extent is exceedingly harmful in cases where the catalyst is regenerated in situ. It was only rather recently realized that the frequent unsuccessful attempts to regenerate catalysts of the type in question in situ was due to the regeneration gases oxidizing the sulfide surfaces and scale, etc. carried into the reactor with the reactant vapors. The products of such oxidation are extremely damaging to the catalyst.

In processes of the type in question it is frequently the practice to house the very costly noble metal catalyst in a number of small converters or catalyst cases operated in series. In this way small portions of the catalyst which may have declined to below the normal desired activity level can be replaced as desired without replacing the total catalyst charge which may run to as much as a million dollars. While in theory it is possible to connect these catalyst cases in a very large number of ways and in some cases they have been connected to allow one catalyst case to be substituted for any one of the others and thereby allow regeneration of any single catalyst case independently, the catalyst cases are generally connected for straight series flow.

Perhaps the main reason for the straight series flow arrangement has been that the processes of the type in question all operate with hydrogen at relatively high pressures and temperatures and the transfer lines are normally quite large. It is most difficult to fabricate suitable valves for this type of service. A single valve for use in the main flow lines in such processes represents a capital cost of several thousands of dollars (generally around $25,000 each) and some of the elaborate schemes for low pressure non-hydrogen processes such as catalytic cracking if applied in processes such as here involved would require a capital expenditure of around a million dollars for valves alone.

In the present invention, a hydrotreating process is carried out in a system of five reactors which by a unique system of flow lines and valves provides a remarkable degree of flexibility with comparatively few valves. With this system the operation may be carried out in ways to minimize difficulties due to halogen migration, promoter migration and the sulfiding problem.

In brief, the system of the invention comprises five catalyst cases each containing approximately the same amount of the noble metal catalyst and connected in such a way that at least 17 different sequences of flow may be established to allow the replacement of the catalyst in any particular catalyst case without shutting down the plant, to allow correction to be made for migration of halogen, to allow correction to be made for migration of the noble metal promoter, and to alleviate the sulfide problem.

The particular system of the invention involving, as mentioned, 17 different flow arrangements is difficult to describe in words but is readily understood by reference to the drawing which is a schematic flow diagram of a reforming plant embodying the invention. It will be apparent from the flow diagram that the system is most versatile and capable of accomplishing the desired objectives. Thus, the oil to be treated enters via line 10 and the hydrotreated product issues via line 41. The reaction cases are labelled A, B, C, D, E. Referring to the flow diagram it will be seen that by suitable manipulation of the valves shown any one of the following flows can be established and retained as long as desired: ABCD, EBCD, AECD, ABED, ABDE, ABCE, ABCD=E, A=EBCD, AB=ECD, ABC=ED, DBCE, ADCE, A=DBCE, AB=DCE, ABC=D=E, ABC=D, ABC=E, ABD=E. The double bar or = sign between the catalyst cases signifies that these two cases are operated in parallel or in other words, at a lower space velocity than when involved in series flow. This is a particularly desirable feature since it allows the catalyst in such cases to be used much longer in a more deactivated state than could be otherwise tolerated without curtailing the throughput of the entire plant. With this arrangement, for example, either reactor case D or E which normally, being the last reactor cases, will be subject to the greatest concentration of halogen or metal promoter by migration under normal operation in the alphabetical order can be shifted to the most foremost position to return the halogen or metal promoter or both to subsequent reactors.

In most cases the hydrotreating reactions involved are either exothermic or endothermic. It will understood that means for adjusting the temperature to an optimum value may be interposed between any two cases connected in series. However, another advantage of the system is that for platforming of gasoline fractions and similar processes where reheating is desired, only two reheaters or reheating furnaces are required. These are illustrated in the flow diagram. It will be noted that there are only two such reheaters and that they are placed between reactor cases A and B and between reactor cases B and C. There is no reheater to the right of reactor C and yet either reactor case D or E may receive preheated feed.

It is also to be understood that in some cases a three or four way valve may be used but that the extra passage in such a valve is equivalent to the line which such passage replaces.

As indicated above, any of the reactor cases may be prepared for regeneration of the catalyst therein and may be taken off-stream for such regeneration without stopping the process. Suitable connections for effecting the regeneration when any particular catalyst case is off-stream will of course be provide where needed. In the interest of simplicity and clarity these connections, which are not germane to the invention, have been omitted in the flow diagram.

To illustrate the invention and its advantages more clearly, the reforming of 16,000 barrels per day (b./d.) of straight-run naphtha will be described with reference to the drawing. The naphtha charge has an initial boiling point in ASTM distillation of 167° F., at 10% point of 184° F., a 50% point of 213° F., a 90% point of 292° F., and an end point of 341° F. The charge has a gravity of 62.2° API, and an F–1–0 octane number of 52. Hydrocarbon type analysis of the naphtha shows no olefins, about 56% paraffins, 37% naphthenes, and 7% aromatics.

The reaction system is comprised of five catalyst cases, each containing approximately 30,000 pounds of suitable noble metal reforming catalyst, such as commerically available platinum catalysts.

Naphtha from line 10 is admixed with 84.6 million standard cubic feet of recycle hydrogen gas (81.4% m. $H_2$) from line 11 and heated to 1000° F. by suitable means such as heater 12. The heated naphtha is then passed through charge line 13 and valve 14 (valve 15 is closed) to catalyst case A at 350 p.s.i. pressure. Due to the exothermic nature of the reaction, the partially converted charge is at a temperature of about 865° F. when it leaves catalyst case A through valve 16 (valve 17 is closed) and line 18 to first reheater 19 wherein the partially converted charge is brought back to a temperature of about 1000° F. The reheated charge is then introduced by line 20, through valve 21 (valve 22 is closed) to catalyst case B. Here again the reaction is endothermic and the partially converted charge at a temperature of 905° F. is passed through valve 23 (valve 24 is closed) and line 25 to second reheater 26 wherein the temperature is again brought back to about 1000° F. It is then introduced by line 27 and valve 28 (valve 29 is closed) to catalyst case C. The partially converted charge from catalyst case C flows through valve 30 (valve 31 is closed), line 32, and valve 33 (valves 34 and 39 are closed) to catalyst case D. The final product stream from reactor case D flows through valve 36 (valves 35 and 38 are closed), and product line 41 to a gas separation and product fractionation system. In the gas separation and product fractionation system, a hydrogen stream is separated from condensed liquids which are fractionated to recover the finished reformate product. That portion of the separated hydrogen stream which is required for recycle is withdrawn and returned via line 11 as hereinabove described. Since the gas separation and product fractionation system per se are conventional and are not part of this invention it is not shown in the drawing for the sake of simplicity and will not be described in any further detail.

After the system has been on-stream for one or more days there will be a decline in activity of the catalyst, particularly in those catalyst cases toward the end of the reactor train wherein the conversion reaction is hydrocracking, as contrasted to dehydrogenation reactions such as in the first reactors. Therefore, as an illustration of switching operations, catalyst case E is substituted for catalyst case C in the reaction train by opening valves 29, 40, 37 and 31 (valves 38 and 39 are closed) and closing valves 28 and 30.

Catalyst case C is depressured and purged with inert gas prior to regeneration.

As mentioned hereinbefore, in the interest of simplicity and clarity, the lines and connections for purging and regenerating the reactor cases are not shown. The regeneration of reforming catalysts is now conventional and well known in the art and is not part of the present invention. In the regeneration, carbon is first burned from the catalyst with dilute air, e.g. less than about 1% $O_2$ and preferably about 0.5% $O_2$, to prevent the combustion front from exceeding about 1050° F. When the combustion front has completely traversed the bed, the oxygen concentration is increased to substantially that of air and the temperature is increased to about 1050° F. to ensure that substantially all the carbon has been removed and to redisperse the noble metal on the support. Following the carbon burn-off, the halogen content can be adjusted to the desired level by adding chloride to the regeneration gases or by stripping-off excess chloride by a suitable stripping gas. To prepare the reactor case for use, air is purged from the reactor case by an inert gas purge, preferably with inert gas free of carbon oxides, and then the inert gas is purged from the reactor case with hydrogen. The reactor case can be cooled or heated as necessary by adjusting temperature of the purge gases. The reactor case is then pressured with hydrogen gas to operating pressure.

Reactor case C is returned to use by opening valves 28 and 30 and closing valves 29, 40, 37 and 31. In the third regeneration cycle, catalyst case E, after regeneration, is substituted for reactor case B by opening valves 22, 40, 37, 24 and closing valves 21 and 23. Thus, in cycle 3, the flow is AECD. For the fourth regeneration cycle, reactor case C is removed from the line by opening valves 21, 23, 29 and 31 and closing valves 22, 24, 28 and 30. The flow sequence is ABED.

Additional regeneration cycles are carried out in a similar manner. Thus, for illustration, a complete cycle involving 18 regenerations is given as follows:

| Regeneration Cycle | Reactor Flow Sequence | Reactor Being Regenerated |
|---|---|---|
| 0 | ABCD | |
| 1 | ABED | C. |
| 2 | ABCD | E. |
| 3 | AECD | B. |
| 4 | ABED | C. |
| 5 | ABCE | D. |
| 6 | ABCD | E. |
| 7 | ABED | C. |
| 8 | ABCE | D. |
| 9 | ABCE | B. |
| 10 | ABDE | C. |
| 11 | ABCD | E. |
| 12 | ABCE | D. |
| 13 | ABDE | C. |
| 14 | ABCD | E. |
| 15 | AECD | B. |
| 16 | ABED | C. |
| 17 | ABCE | D. |
| 18 | DBCE | A. |

In the above sequence of operations, catalyst case A is regenerated one time, catalyst case B is regenerated 3 times, catalyst case C is regenerated 6 times, catalyst case D is regenerated 4 times, and catalyst case E is regenerated 4 times.

We claim as our invention:

A multi-reactor system for the sequential hydrotreating of oils with a plurality of fixed beds of noble metal catalyst, said system comprising a first, second, third, fourth and fifth case, each charged with a fixed bed of noble metal catalyst, an inlet manifold, inlet branches connecting the inlet manifold to the inlet of each case, an outlet manifold, outlet branches connecting the outlet manifold to the outlet of each case, a charge line connected to the inlet branch of the first case, valve means in the inlet branch of the first case to pass flow selectively from the charge line to the first reactor case and alternately to the inlet manifold, a first interstage heater the inlet of which is connected to the outlet branch of the first case and the outlet of which is connected to the inlet branch of the second case, valve means in the outlet branch of the first case to pass flow selectively to the first interstage heater from the first case and alternately from the outlet manifold, valve means in the inlet branch to the second case to pass flow selectively from the first interstage heater to the second reactor case and alternately to the inlet manifold, a second interstage heater the inlet of which is connected to the outlet branch of the second case and the outlet of which is connected to the inlet branch of the third case, valve means in the outlet branch of the second case to pass flow selectively to the second interstage heater from the second case and alternately from the outlet manifold, valve means in the inlet branch to the third case to pass flow selectively from the second interstage heater to the third case and alternately to the inlet manifold, valve means in the inlet branch to the fourth and fifth case, an inter-connecting line connecting the outlet branch of the third case to the inlet branch of the fourth and fifth cases between the valve means in the fourth and fifth inlet branches and the fourth and fifth cases, respectively, valve means in the outlet branch of the third case to pass flow selectively to the inter-connecting line from the third case and alternately from the outlet manifold, valve means in the inter-connecting line to pass flow selectively from the inter-connecting line to the inlet branch of the fourth case and alternately to the inlet branch of the fifth case, valve means in the outlet branch of the fourth and fifth cases, a product line connected to the outlet branch of the fourth and fifth cases between the valve means in the fourth and fifth outlet branch and the fourth and fifth cases, respectively, and valve means in the product line to pass flow selectively to the product line from the outlet branch of the fourth case and alternately from the outlet branch of the fifth case.

References Cited in the file of this patent

UNITED STATES PATENTS

| 2,773,014 | Snuggs et al. | Dec. 4, 1956 |
| 2,853,436 | Roberts | Sept. 23, 1958 |
| 3,011,965 | Decker | Dec. 5, 1961 |